June 5, 1951

H. W. ANGELERY 2,555,528

AIR CONDITIONING SYSTEM

Filed April 26, 1946

INVENTOR.
HENRY W. ANGELERY
BY
Campbell, Brumbaugh & Free
his ATTORNEYS

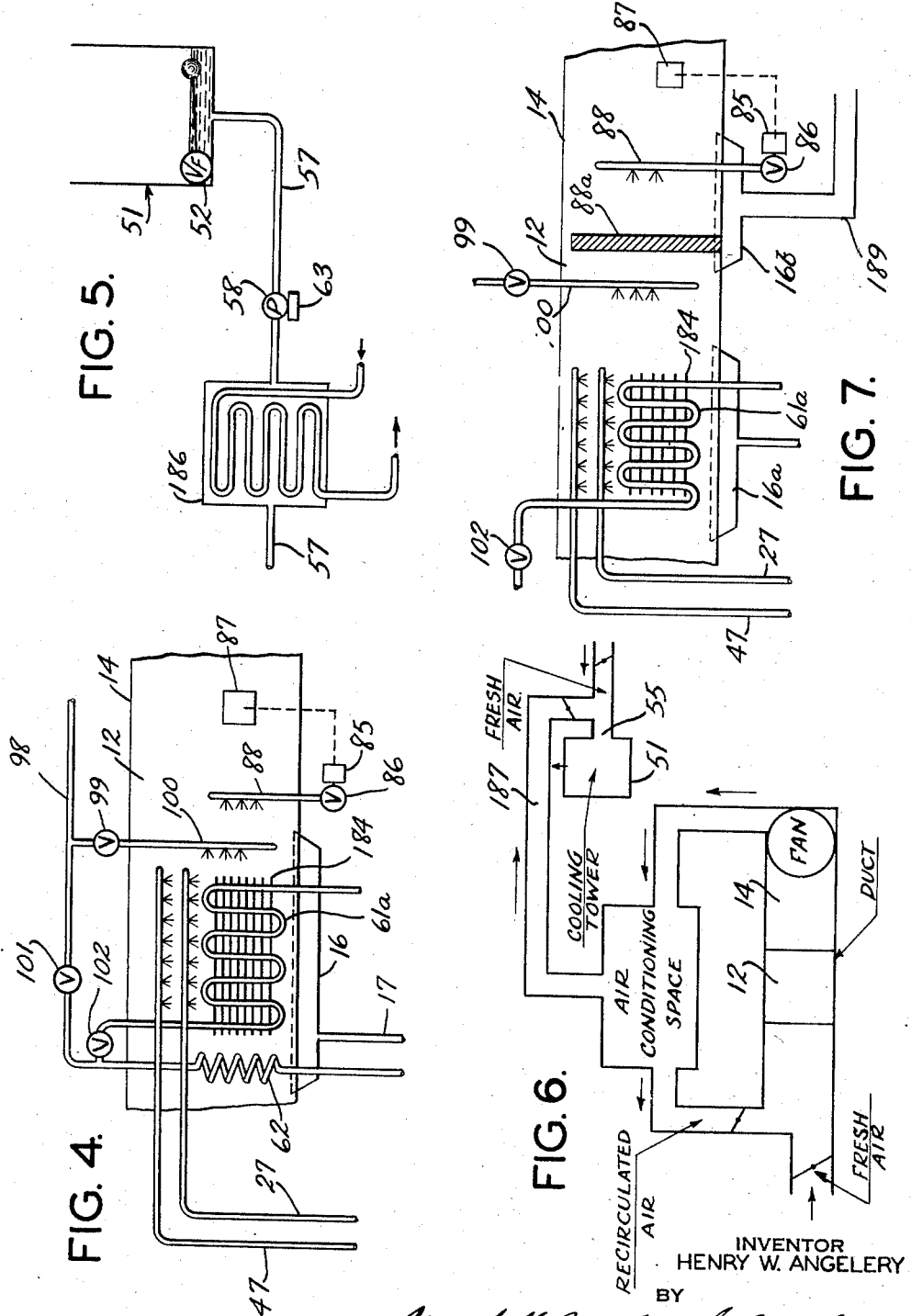

Patented June 5, 1951

2,555,528

UNITED STATES PATENT OFFICE 2,555,528

AIR-CONDITIONING SYSTEM

Henry W. Angelery, Englewood, N. J.

Application April 26, 1946, Serial No. 665,190

12 Claims. (Cl. 257—3)

This invention relates to an air conditioning system.

The general object of the invention is to provide an improved method of, and apparatus for, air conditioning an enclosure, such as for example, an office building, a private dwelling, theatre, school, hospital, apartment, hotel and the like.

It is an object of the invention to provide an improved method of, and apparatus for, conditioning air adapted to provide cooling under summer operating conditions and heating under winter operating conditions while at the same time maintaining whatever relative humidity is predetermined to be desirable within the conditioned enclosure.

It is another object of the invention to provide an air conditioning system using a hygroscopic fluid to maintain, in whole or in part, the desired relative humidity of the air within the conditioned enclosure. It is also an object of the invention to provide a method of, and apparatus for, regenerating such hygroscopic fluid so that it will not be necessary to replace appreciable amounts thereof from time to time.

Still another object of the invention is to provide an air conditioning system wherein a hygroscopic fluid is utilized for the dual function of dehumidifying and cooling the air prior to its introduction into the enclosure.

Another object is to provide an air conditioning system wherein rehumidification and additional cooling of previously dehumidified and cooled air can take place when the relative humidity of the air within the enclosure is sufficiently low to permit a further lowering of the dry bulb temperature by adiabatic cooling, that is, by converting some of the sensible heat of the air within the conditioning apparatus to latent heat of vaporization of the moisture used to rehumidify the air.

Yet another object is to provide an air conditioning system wherein the moisture removed from the air in the course of its dehumidification is made available to the system for further use.

A further object is to provide a system for recovering any hygroscopic fluid that may escape from the regenerating unit.

Broadly stated, the invention includes a method of, and apparatus for humidifying air or dehumidifying air passing through a conditioning chamber by spraying it with a hygroscopic fluid. The sprayed fluid is collected and if desired passed through a regenerating unit operating on the principle of a fractionating column or still. The invention also includes a method of, and apparatus for heating or cooling the air passing through a conditioning chamber as well as humidifying or rehumidifying said air, in whole or in part, by spraying water or steam into it. Furthermore, the invention includes a system of electrical controls designed to operate the system automatically so that the sensible temperature and humidity conditions within the conditioned enclosure desired by the occupants will be maintained at all times.

These and other features, objects and advantages of the invention, will appear more fully from the following description to be read in connection with the accompanying drawings, in which:

Figures 4, 5, 6 and 7 are diagrammatical views illustrating several alternative arrangements of the air conditioning system illustrated in Figure 1.

Figure 1:
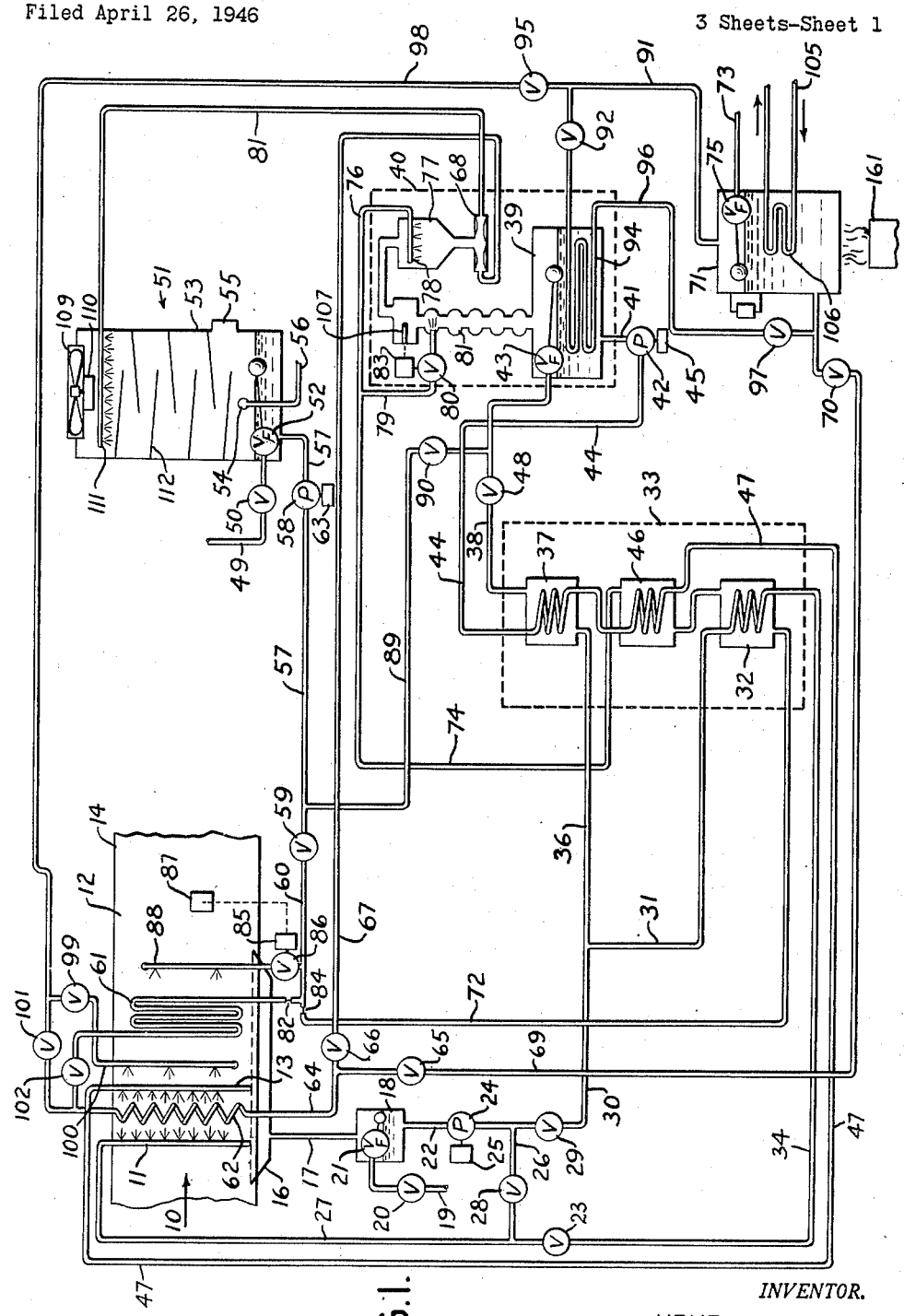
Figure 1 is a diagrammatical view illustrating an air conditioning system embodying the invention.

The air conditioning system herein described is adapted to use a hygroscopic fluid having a vapor pressure lower than that of water vapor in air at atmospheric conditions. It has been found preferable to use a hygroscopic hydrocarbon fluid because hydrocarbons do not generally undergo crystallization. The hgyroscopic fluid used in accordance with this invention should not be corrosive, odoriferous or toxic in either liquid or vapor form unless, of course, such corrosive, odoriferous or toxic properties can be neutralized or minimized effectively. Furthermore, neither the liquid nor the vaporous forms of this fluid should be inflammable or explosive at temperature and pressure conditions such as are ordinarily encountered in the system. It has been found that non-inflammable alcohols, including polyhydroxy alcohols, amino alcohols, and alicyclic alcohols are generally useful as hygroscopic fluids for the purposes of this invention. Examples of suitable polyhydroxy alcohols are the glycols such as ethylene glycol, diethylene glycol, triethylene glycol, propylene glycol, the glycerols and the like. Suitable amino-alcohols are, for example, mono-, di-, and triethanol amines and the like. Cyclohexanol is a typical example of the alicyclic alcohols that come within the contemplation of this invention. These or similar alcohols having the prescribed properties may be used singly or in combination with one another. Ethylene glycol alone, or a mixture of a glycol, such as ethylene glycol, with an ethanol amine, such as monoethanol amine have, for example, been found to be particularly suitable for use in this invention.

In the following description of the invention with reference to the drawings, the discussion of the system has been segregated under various headings solely for the convenience of the reader, and has been limited to only a few preferred modifications of the invention for the purpose of simplicity. It will be understood, however, that the scope of this invention includes all other alternatives and modifications as hereinafter set forth as well as methods, apparatus and materials equivalent to those described herein.

*General description of the hygroscopic fluid circuit*

The hygroscopic fluid is injected into the air stream designated generally by arrow 10 by means of spray nozzles 11 and 13 located in the air conditioning chamber 12 of duct 14 and positioned to spray the fluid onto coil 62. The liquid collected in sump 16 at or near the bottom of air conditioning chamber 12 is thereupon led through line 17 to a receiver 18. If the hygroscopic fluid within receiver 18 is to be diluted, make-up water from any suitable source 19 controlled by valve 20 is introduced into collector 18 by way of float valve 21, the latter valve having the function of preventing introduction of water from source 19 when the level of liquid within receiver 18 has reached a maximum level. The diluted hygroscopic fluid is withdrawn from receiver 18 through line 22 and placed under pressure by means of pump 24 operated by motor 25. Depending upon the position of valves 28 and 29, the fluid may then be recycled, in whole or in part, directly to spray nozzles 11 through lines 26 and 27 and valve 28. When all of the fluid is to be recycled directly to spray nozzles 11, valves 23 and 29 are closed. If the fluid is passed through valve 29 and into line 30, part or all of it may thereupon pass through line 31, heat exchanger 32 of heat exchanger unit 33, wherein it loses heat, and is recycled to spray nozzles 11 by way of lines 34 and 27. Some of the fluid in line 30 may, however, depending upon conditions to be described later, pass through line 36, heat exchanger 37 wherein it absorbs heat, line 38 and valve 48 into vaporizer 39 of regenerator unit 40 through float valve 43, the latter valve having the function of preventing the introduction of fluid to vaporizer 39 when the level of the liquid therein has reached a maximum level. Hot concentrated hygroscopic fluid is withdrawn from the lower portion of vaporizer 39 through line 41 and by means of hot fluid pump 42 recycled to spray nozzles 13 by way of line 44, heat exchangers 37 and 46, wherein the fluid loses heat, and line 47.

*General description of water and steam circuits*

Water from any suitable source 49 controlled by valve 50 is introduced by way of float valve 52 into a cooling tower 51. Water withdrawn from cooling tower 51 through line 57 is placed under pressure by pump 58 operated by motor 63. When valves 59 and 102 are open and valve 101 is closed, a part of this water passes through line 60, coils 61 and 62 and into line 64. With valve 66 open and valve 65 closed, the water from coils 61 and 62 passes from line 64 through line 67 to ejector 68. Another part of the water from pump 58 passes through valve 59, line 72, heat exchangers 32 and 46 and thence into line 74. From this line all or part of the water will pass through line 76 and be sprayed into condenser 77 through spray nozzles 78. Some of the water in line 74 may pass through line 79 and valve 80 operated by motor 83 energized by operation of thermostat 107 to be injected into column 81 of regenerating unit 40. The water leaving ejector 68 is conducted by way of line 81 to the top of cooling tower 51. The relative amounts of water flowing through coils 61 and 62 on the one hand and through heat exchangers 32 and 46 on the other are controlled by any suitable control means such as balanced fixed orifices 82 and 84. Another part of the water from pump 58 flowing through valve 59 and line 60 may pass through valve 86, operated by motor 85 when the motor is energized by a duct humidistat 87 in duct 14, to be sprayed by means of spray nozzles 88 into the stream of air 10 passing through conditioning chamber 12. By closing valves 59 and 48 and opening valve 90 water from cooling tower 51 may pass through line 89 to be introduced into vaporizer 39 of regenerating unit 40 for a purpose hereinafter described.

Steam is generated in boiler 71 provided with oil or gas burner 161, a supply of make-up water 73, and a float valve 75 to control the entry of make-up water into the boiler, and allowed to leave said boiler through line 91. When valve 92 is open, part or all of the steam from boiler 71 will pass through heating coil 94 in vaporizer 39 of regenerating unit 40 for recycling to the boiler by way of line 96 and valve 97. When valve 95 is open, another part or all of the steam generated in boiler 71 will pass through line 98. When valve 99 is open, all or part of the steam in line 98 will be injected into air stream 10 by spray nozzles 100. With valve 102 closed and valve 101 open, all or the remainder of the steam in line 98 will pass through coil 62 and into line 64. With valves 65 and 70 open and valve 66 closed, the steam and condensate from coil 62 will return to boiler 71 by way of line 69.

If it is desired to use the system to provide a domestic hot water supply as well as to condition air, hot water may be obtained from any suitable source 105 of fresh water and passed through a coil 106 in boiler 71, as shown schematically in Figure 1 of the drawings.

*General description of the apparatus*

Regenerator unit 40, as shown in Figure 1, consists essentially of a vaporizer 39, a fractionating column or still 81, a water vapor condenser 77, and an ejector or vacuum pump 68. The liquid in the vaporizer 39 may be heated by steam or hot water passing through coil 94 or directly by an outside source. The level of the liquid within vaporizer 39 is maintained at or below a predetermined maximum by means of float valve 43. If the level of the liquid in vaporizer 39 should be at the maximum and valve 43 be closed, all the hygroscopic fluid in line 30 will pass through line 31 and heat exchanger 32 to be recycled to spray nozzles 11. The heat generated in vaporizer 39 by the steam in heating coil 94 causes the dilute hygroscopic fluid therein to vaporize sufficiently to concentrate said fluid. The resulting mixture of water vapor and hygroscopic fluid vapor leaves vaporizer 39 to ascend column 81 which is kept under atmospheric or sub-atmospheric pressure by ejector or vacuum pump 68 and may, if desired, be provided with a cooling jacket (not shown) supplied either by fresh water, line 74, or other relatively cold water circulating within the system. Water is injected into column 81 at or near the top thereof in a quantity controlled by valve 80 operated by motor or solenoid 83 which in turn is controlled by thermostat 107 at the top of column 81 to open valve 80 when the temperature in the top of column 81 is high and close valve 80 when the temperature in the top of column 81 is low. Thus, thermostat 107, motor or solenoid 83 and valve 80 cooperate to maintain the temperature in column 81 within the range required for optimum separation of hygroscopic fluid vapor from water vapor at the pressure prevailing within column 81. The water introduced at the top of column 81 absorbs heat adiabatically from the hygroscopic fluid vapor and, because of its higher vapor pressure is vaporized to join the water vapor originating in vaporizer 39, ascending column 81 and passing into condenser 77. The heat lost by the hygroscopic fluid vapor to vaporize the water introduced near the top of column 81 and to any cooling jacket (not shown) around column 81 causes the hygroscopic fluid vapors to recondense and return to vaporizer 39. As the operation continues, the concentration of hygroscopic fluid in vaporizer 39 increases progressively so that when it is withdrawn through line 41, it has a higher concentration than it had when it first entered vaporizer 39 through float valve 43. The water vapors ascending column 81 enter condenser 77 and are condensed by a spray of water ejected from nozzle 78. Both the condensed and the condensing water is thereupon removed from condenser 77 by means of ejector 68 fed by water from line 67. The water removed is thereupon either discharged to waste or recycled through line 81 to cooling tower 51.

It is inevitable, in spite of the rigid temperature control exercised in column 81 through the medium of thermostat 107, motor or solenoid 83 and valve 80 as well as by a water or cooling jacket around column 81, that some small quantities of hygroscopic fluid vapor will pass into condenser 77 and be introduced into cooling tower 51. By closing valves 50, 59 and 48, opening valve 90, and operating pump 58, means are provided for periodically removing from tower 51 the water containing some hygroscopic fluid, and introducing it into vaporizer 39 to recover the hygroscopic fluid therefrom. This operation may be carried out at any time, such as in the autumn, winter or spring, when it is unnecessary to eject concentrated hygroscopic fluid through spray nozzles 13.

The regenerating unit, in addition to its function as a concentrator and recoverer of hygroscopic fluid, has the further function of providing the system with a source of make-up water from the atmosphere. The water vapor absorbed by the hygroscopic fluid in conditioning chamber 12 is revaporized in vaporizer 39 and recondensed in condenser 77 of regenerating unit 40 and passed into cooling tower 51 for further use in the system.

Figure 2:
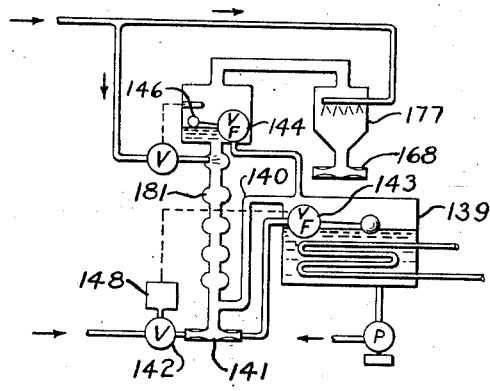
Figure 2 is a diagrammatical view illustrating an alternative arrangement for the regenerating unit.

It sometimes happens that space requirements do not permit a fractionating column or still, such as that designated in Figure 1 by reference numeral 81, to be located above vaporizer 39. An alternative construction of the regenerating unit has therefore been devised as shown in Figure 2 of the drawings. This regenerating unit likewise consists essentially of a vaporizer 139, a fractionating column or still 181, a water vapor condenser 177 and an ejector or vacuum pump 168. The principle of operation of this regenerating unit is the same as that of the regenerating unit shown in Figure 1, the only important difference being that the bottom of column 181 is located at a point below the elevation of the liquid level maintained in vaporizer 139. The mixture of water vapor and hygroscopic fluid vapor is conducted by a suitable passage 140 from the top of vaporizer 139 to the lower portion of column 181. The separation of water vapor from the hygroscopic fluid vapor is conducted in column 181 in the same manner as described with reference to column 81. However, the condensed hygroscopic fluid is collected in liquid form at the bottom of column 181 and recycled into vaporizer 139 by means of dilute hygroscopic fluid acting through ejector 141. The quantity of dilute hygroscopic fluid allowed to enter ejector 141 is controlled by valve 142 operated by a motor or solenoid 148 energized to open valve 142 by the action of float valve 143 when the level of the liquid in vaporizer 139 is below the maximum that is allowable and to close valve 142 when said level is at or above the maximum. An excess accumulation, in column 181, of hygroscopic fluid in liquid form is prevented from being carried over to condenser 177 by a float equalizing valve 144 located at the top of column 181. If the level of the liquid in column 181 should rise to the level of float 146 of float equalizing valve 144, the float will rise to open valve 144 to allow the liquid to be discharged back into vaporizer 139. In this event, the liquid in column 181 can be drained out by means of a suitable drain valve (not shown) at or near the bottom of column 181.

Heat exchanger unit 33 is preferably subdivided into three heat exchanger elements designated in Figure 1 by reference numerals 37, 46 and 32. The dilute hygroscopic fluid from sump 16 flowing to vaporizer 39 of regenerating unit 40 absorbs heat from the hot, regenerated hygroscopic fluid in heat exchanger unit 37. The latter is cooled still more in heat exchanger unit 46 wherein it loses heat to water before said water is introduced to column 81 or condenser 77. The hygroscopic fluid from sump 16 for recycling to sprays 11 by way of lines 31 and 34 is somewhat warmer than the water from cooling tower 51 and, therefore, gives up some of its heat in heat exchanger unit 32 to the water passing therethrough to heat exchanger unit 46.

Conditioning chamber 12 in duct 14 contains coils 61 and 62, sprays 11, 13, 100, and 88, a duct humidostat 87 and a sump 16 to collect the free liquid therein. Sprays 11 are used to humidify and sprays 11 and 13 are used to dehumidify, depending upon conditions hereinafter described, air stream 10 which may be fresh air from the atmosphere, recirculated air from the conditioned enclosure or a combination thereof. Sprays 88 may be used to spray water into the conditioning chamber, and preferably onto cooling coil 61, depending upon the requirements within the enclosure as reflected by a summer thermostat and humidostat therein and, if desired, upon the relative humidity within duct 14 as reflected by duct humidostat 87, as will hereinafter be described, to humidify or rehumidify and cool air stream 10. As will likewise be pointed out hereinafter, sprays 88 may be used alone or in combination with sprays 11 and 13. Coils 61 and 62 may be used together to cool air stream 10 in cooperation with sprays 11, 13 and/or 88. Coil 62 in combination with sprays 100 may be used to heat and humidify air stream 10. When it is desired to use coils 61 and 62 for the purpose of cooling air stream 10, valves 59, 102, and 66 are opened while valves 101 and 65 are closed and pump 58 is set into operation by motor 63, as hereinafter described. Heating by means of coil 62 is accomplished by setting into operation oil or gas burner 161, opening valves 95, 101, 65 and 70, and closing valves 102, 92, 97 and 66. If it is desired to use sprays 100 for humidification, valve 99 is also opened.

Cooling tower 51 comprises a shell 53 provided with an air intake port 55 and at the top thereof a fan 109 driven by motor 110 to expel air therefrom. Beneath motor 110 cooling tower 51 is provided with spray nozzles 111 and a series of baffles 112 to allow the water from spray nozzles 111 to trickle through the tower. Near the bottom, cooling tower 51 is provided with a float valve 52 and an overflow weir or opening 54. Float valve 52 operates to control the level of the water within cooling tower 51, in that it permits fresh water from source 49 to be introduced to maintain a minimum level of water in the tower and shuts off the supply of fresh water when a predetermined higher level is reached. The overflow weir 54, or similar device, is used to control the maximum level of water in cooling tower 51. Any excess water in cooling tower 51 is, of course, withdrawn through weir or overflow 54 and passed to waste by means of line 56. The recirculated water from ejector 68 is sprayed into the top of cooling tower 51 through nozzles 111 and in passing downwardly over baffles 112 is cooled by evaporation, due in part at least, to the counter-flow of air entering the tower through inlet port 55 and expelled at the top of tower by means of fan 109 driven by motor 110.

*General description of electrical system*

Figure 3:
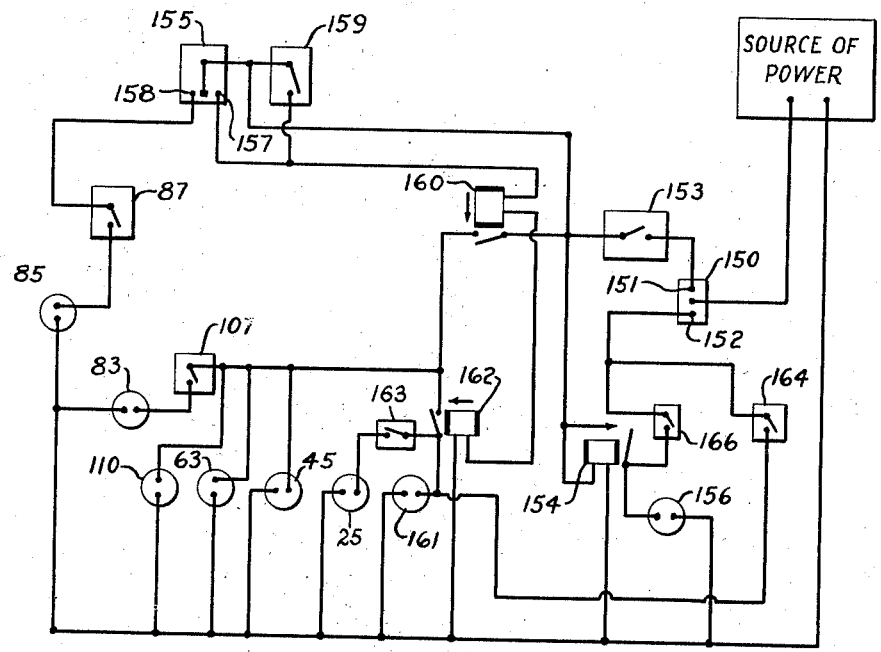
Figure 3 is a diagrammatical view illustrating an electrical control system for an air conditioning system embodying the invention.

For ease of description and understanding, the electrical control circuit is shown diagrammatically in Figure 3 of the drawings. One conductor from any suitable source of power leads to switch 150 having a "summer" terminal 151 and a "winter" terminal 152. From the summer terminal 151 a conductor leads to a manually operated switch 153, the closing of which energizes relay 154 to in turn energize motor 156 driving the air supply fan (not shown) that drives air stream 10 through conditioning chamber 12 and duct 14 to the conditioned enclosure. The closing of fan switch 153 not only energizes motor 156 but also sets into operation summer humidostat 155 and summer thermostat 159, both of which are located within the conditioned enclosure. Summer thermostat 159 is of the type that has a compensated setting, that is, it is responsive to both outside and inside temperature so as to maintain a graduated temperature differential of no more than about 15° F. between outside and inside temperatures and does not allow the inside temperature to fall below a predetermined minimum setting such as 75° F., for example. As shown diagrammatically in Figure 3, therefore, thermostat 159 will operate to open the circuit to relay switch 160 when the temperature within the enclosure falls below either the compensated or the minimum setting. Humidostat 155 is provided with a terminal 157 which is closed when the humidity within the enclosure exceeds the maximum desired setting and with a terminal 158 that is closed when said humidity becomes less than the minimum desired relative humidity setting.

If either the relative humidity or the temperature within the enclosure is such as to close the circuit to energize the relay switch 160, said switch in turn energizes motors 45, 63 and 110 for hot fluid pump 42, water pump 58 and fan 109, respectively, and relay switch 162 which with switch 163 closed, in turn energizes motor 25 for cold fluid pump 24 as well as 161 to generate steam in boiler 71. Relay switch 160 also closes the circuit to thermostat 107 in the top of column 81 of regenerating unit 40. Thermostat 107 is connected in series with motor 83 for valve 80 regulating the amount of water injected into column 81 and is in the open position shown in Figure 3 when the temperature in the top of column 81 is insufficient to allow water vapor to pass from said column into condenser 77. If the relative humidity in the conditioned enclosure is such as to close terminal 158 of humidostat 155, the circuit is closed to duct humidostat 87, which, if the relative humidity of air stream 10 leaving conditioning chamber 12 is below the setting of humidostat 87, that is, sufficiently low, as determined by the operator, to allow adiabatic cooling of the air stream, will further close the circuit to energize motor 85 to open valve 86 to operate spray nozzles 88. It is apparent, however, that if the relative humidity within the enclosure and the duct are both low enough to bring about the opening of valve 86, no water will be sprayed through sprays 88 unless the temperature within the enclosure is high enough for thermostat 159 to close the circuit to operate motor 63 for pump 58.

When the "summer" terminal 151 is opened and "winter" terminal 152 is closed for winter operation, the circuit is closed to winter thermostat 164 and water thermostat 166. Thermostat 164 is in the open position shown in Figure 3 when the temperature in the enclosure is above the minimum temperature and in closed position to close the circuit to oil or gas burner 161 when the temperature in the enclosure falls below said minimum temperature. Water thermostat 166, which is located in or adjacent to coil 62 and is responsive to the temperature therein, is in the open position shown in Figure 3 when the temperature of coil 62 is low and in closed position to close the circuit to air supply fan motor 156 when the temperature of coil 62 is sufficiently high to adequately heat air stream 10.

It becomes apparent, therefore, that when the temperature in the conditioned enclosure falls below the desired setting, thermostat 164 closes the circuit to allow oil or gas burner 161 to generate steam in boiler 71. When this steam has raised the temperature of coil 62 sufficiently, water thermostat 166 in turn closes the circuit to motor 156 to start the air supply fan to commence circulating air through conditioning chamber 12. When the temperature in the enclosure has reached the desired level, the circuit is opened by thermostat 164 to shut off oil burner 161. The lack of steam under pressure allows coil 62 to cool. This causes water thermostat 166 to open the circuit, shut off motor 156 for the circulating fan.

When a source of steam is available, such as from a city steam supply or a steam boiler such as boiler 71, it may be preferable to humidify the air in winter operation by use of steam sprays. In this event, switch 163, connecting motor 25 in parallel with oil or gas burner 161, or in parallel with a solenoid or motor to control a valve to in turn regulate the supply of outside steam, is open so that pump 24 will not operate to circulate the hygroscopic fluid through lines 22, 26 and 27, spray nozzles 11, sump 16, line 17 and receiver 18. Valve 99 is open so that when steam will be sprayed from nozzles 100, and, when lack of steam under pressure allows coil 62 to cool, the same lack of pressure will suffice to cut off the flow of steam through nozzles 100.

If, on the other hand, it is desired to use the hygroscopic fluid for the purpose of humidifying air stream 10, switch 163 is closed so that the circulation of fluid begins upon commencement of heating in coil 62.

*Summer operation*

For normal summer operation switch 163 is closed and switch 150 is positioned to close terminal 151 of said switch. The closing of switch 153 thereupon brings into immediate operation the air supply fan powered by motor 156 so as to provide circulation of air through conditioning chamber 12 and into the enclosure by way of duct 14. When either the temperature within the enclosure rises sufficiently to operate thermostat 159 or the relative humidity within the enclosure becomes sufficiently high to close terminal 157 of humidostat 155, the circuit is closed to energize relay 160 which in turn sets into operation oil or gas burner 161, motors 25, 45, 63 and 110, as well as thermostat 107 in the top of fractionating column 81. With valves 70 and 95 closed and valves 92 and 97 open, the steam generated in boiler 71 circulates through coil 94 to bring about the heating of hygroscopic fluid in vaporizer 39. With valves 23, 29 and 48 open and valves 20, 28, and 90 closed, motor 25 operates pump 24 to circulate the hygroscopic fluid around the system as hereinbefore described. Motor 45 operates pump 42 to withdraw concentrated hygroscopic fluid from vaporizer 39 for ejection through spray nozzles 13 after said fluid has been cooled by passage through heat exchangers 37 and 46. With valves 59, 102 and 66 open and valves 101 and 65 closed, motor 63 operates pump 58 to drive the water from cooling tower 51 through coils 61 and 62 into ejector 68 and through heat exchangers 32 and 46 to the regenerating unit as hereinbefore described. Motor 110 operates fan 109 in the top of cooling tower 51 to draw air into air inlet port 55 and through the cooling tower.. Thermostat 107, which is connected in series with motor 83 operating valve 80, closes the circuit to motor 83 when the temperature at the top of column 81 reaches the range within which the most efficient separation of water vapor from hygroscopic fluid vapor in column 81 takes place at the prevailing pressure within the column. When this temperature, which depends upon the particular hygroscopic fluid used, in the top of column 81 is reached or exceeded, thermostat 107 closes the circuit to motor 83 so that the latter will open valve 80.

If the temperature in the enclosure exceeds the maximum desired temperature so as to cause thermostat 159 to close the circuit to relay 160 but the relative humidity within the enclosure as measured by humidostat 155 is not sufficiently high to cause said humidostat to close the circuit by way of terminal 157, the operation of the system is the same as that described in the foregoing paragraph and will have the effect of lowering both the temperature and the relative humidity within the enclosure. If, in the course of this operation, the relative humidity within the enclosure should fall below that for which humidostat 155 is set before the temperature within the enclosure becomes sufficiently low to open the circuit through thermostat 159, humidostat 155 will close the circuit to duct humidostat 87 by closing terminal 158 of humidostat 155. If the relative humidity within duct 14 measured by duct humidostat 87 is sufficiently low to allow adiabatic cooling of the air stream, duct humidostat 87 will complete the closing of the circuit to motor 85 which upon being so energized will open valve 86 so that some of the water from cooling tower 51 pumped by pump 58 will be sprayed into the air stream through spray nozzles 88. The water sprayed through spray nozzles 88 will thereupon rehumidify as well as further cool air stream 10 so that sooner or later the relative humidity as measured by duct humidostat 87 or humidostat 155 will become high enough to break the circuit to motor 85, or the temperature within the enclosure will become low enough to open the circuit through thermostat 159. If thermostat 159 is the first of these three instruments to respond sufficiently to break the circuit, it will deenergize relay 160 and thereby break the circuit to oil or gas burner 161, motors 25, 45, 63 and 110 and thermostat 107, thus interrupting the flow of water through nozzles 88, the flow of hygroscopic fluid through the system, the flow of water through coils 61 and 62 and through heat exchangers 32 and 46 as well as to halt operation of regenerating unit 40. On the other hand, if either duct humidostat 87 or humidostat 155 should be the first to break the circuit, motor 85 will be the only item of equipment to be deenergized and will accordingly halt the spraying of water through spray nozzles 88 while the remainder of the system continues in operation.

The dehumidification and simultaneous removal of the latent heat of vaporization of the vapor therein is accomplished, when pumps 24 and 42 are in operation, by hygroscopic fluid sprayed into the air stream on coil 62 in conditioning chamber 12. The spraying of the hygroscopic fluid on coil 62 has the beneficial effect of further lowering the temperature of the hygroscopic fluid. Inasmuch as the hygroscopicity of the fluid increases with a reduction in temperature this further enhances the ability of the hygroscopic fluid to remove heat and moisture from air stream 10 and allows the water in coil 62 to remove a more substantial portion of the heat absorbed from air stream 10. The balance of the heat that is absorbed by the hygroscopic fluid is either removed in heat exchanger 32 or supplemented in heat exchanger 37 by hot hygroscopic fluid from regenerator unit 40 prior to the introduction of the dilute hygroscopic fluid into vaporizer 39. The concentrated hygroscopic fluid from regenerator unit 40 is cooled prior to ejection through spray nozzles 13 by passage through heat exchangers 37 and 46.

It thus appears that once switch 150 has been closed in the summer operating position and switch 153 has been closed to operate the air supply fan, the system will function automatically through the entire summer. When the cooling of air stream 10 becomes too intense, thermostat 159 automatically breaks the circuit to bring about an interruption in the flow of water and hygroscopic fluid as well as to interrupt the operation of cooling tower fan 109 and regenerator unit 40. When the temperature within the enclosure is above that desired by the occupants, thermostat 159 will close the circuit to operate cooling tower 51, regenerator unit 40, and the various pumps to maintain circulation and regeneration of the hygroscopic fluid and to maintain the circulation of water in coils 61 and 62 until the temperature has become sufficiently low. If the high temperature in the enclosure is accompanied by a below normal relative humidity, the system provides automatic means, by the action of duct humidostat 87, humidostat 155 and motor 85, to rehumidify and increase further the cooling capacity of the system until the temperature within the enclosure becomes sufficiently low to break the circuit at thermostat 159.

*Winter operation*

To place the system in winter operating condition utilizing steam only for humidification, switch 150 is thrown to close terminal 152, thereby closing the circuit to thermostat 164 and water thermostat 166, and switch 163 is opened. When the temperature in the enclosure falls below the setting of thermostat 164, the thermostat operates to close the circuit further to bring into operation oil or gas burner 161 to generate steam in boiler 71. Relay 162 prevents the circuit from being closed to operate motors 45, 63 and 110 and likewise cuts out operation of thermostat 107, thus effectually barring operation of the cooling tower, the regenerating unit, and the flow of cold water through the system. With valves 92, 97, 102 and 66 closed and valves 95, 99, 101, 65 and 70 open, steam from boiler 71 flows through lines 91 and 98 to enter coil 62 where it is partly or wholly condensed and returned to boiler 71 by way of lines 64 and 69. By the time the steam pressure in boiler 71 has been raised sufficiently to eject steam through spray nozzles 100, the temperature in coil 62 will have been elevated sufficiently to cause water thermostat 166 to close the circuit to bring into operation motor 156 driving the fan or blower to bring about the movement of air through duct 14 and into the enclosure.

It is, therefore, evident that this system provides a method for automatically increasing the humidity as well as the temperature when the thermostat within the enclosure indicates that the temperature therein has become too low. The delayed action of the air driving fan as determined by water thermostat 166 prevents introduction of air into the enclosure until the heating coil in the conditioning chamber has assumed a temperature sufficient to avoid delivery into the enclosure of initially cold air.

As soon as the temperature within the enclosure has become sufficiently high to cause thermostat 164 to open the circuit to oil or gas burner 161, the burner, of course, ceases operation and causes the steam pressure in boiler 71 to decrease. This in turn causes a gradual decrease in the amount of steam ejected through nozzles 100 and a corresponding decrease in the temperature of coil 62. When the temperature in coil 62 falls below the setting for water thermostat 166, it operates to open the circuit to motor 156 and to thereby interrupt the passage of air through conditioning chamber 12 and duct 14 into the enclosure.

The foregoing description has been limited to describing only a few embodiments of a system for automatically regulating the relative humidity and temperature of air supplied to an enclosure. It is to be understood, however, that the invention is not limited strictly thereto and that there are many alternative and equivalent methods and elements of apparatus that come within the contemplation of this invention. Some of these alternative and equivalent methods and elements of apparatus will be hereinafter described.

The elements of structure and methods of operation within the conditioning chamber, for example, may be altered considerably. As shown, for instance, in Figure 4, the hygroscopic fluid, instead of being sprayed through spray nozzles 11 and 13, may be made to trickle over an air filter or a series of air filters 184 or over the cooling coils 61a or the equivalent thereof, such as a honey-combed radiator element. Furthermore, as shown in Figure 5, the cold water in coils 61 or 61a and 62 may, prior to passage therethrough, be conducted through a refrigerating device 186 in addition to or instead of cooling tower 51 and may be replaced by a non-aqueous liquid, vapor or gas.

In the event that the system is to be installed in a structure having a hot water heating system, it is within the contemplation of this invention to eliminate, if desirable, sprays 100 for humidifying the air. If sprays 100 are eliminated, humidification of the air in winter operation may be carried out by opening valves 29 and 28, closing valves 23 and 29 and closing switch 163 to motor 25 operating pump 24. This will cause the hygroscopic fluid collected in receiver 18 to be diluted sufficiently with make-up water from source 19 to release water vapor to the air passing through conditioning chamber 12. In that event, motor 25 operating pump 24 is connected in parallel with oil or gas burner 161 as shown in Figure 3 of the drawings.

It is also within the contemplation of this invention, as illustrated in Figure 6, to enhance the efficiency of the cooling tower 51 by connecting inlet port 55 of cooling tower 51 with a duct 187 for cooled air discharged from the conditioned enclosure so as to increase the ability of the cooling tower to withdraw heat from the liquid sprayed through spray nozzles 111.

Finally, it is to be understood that sump 16 may be divided, as illustrated by way of example in Figure 7, so as to separately collect the hygroscopic fluid from sprays 11 and 13 in one part 16a, and any unvaporized water from sprays 88 in another part 16b. In this event, a baffle or screen 88a, to keep the water spray 88 separate from the sprayed hygroscopic fluid, and separate means 189 for removing the water collected in sump part 16b should be provided.

Although for the purpose of illustration only a few forms of this invention have been disclosed, subsequently other forms thereof may become apparent to those skilled in the art upon reference to this disclosure. This invention is, therefore, to be limited only to the scope of the appended claims.

I claim:

1. An air conditioning system for an enclosure comprising air transmitting means to receive fresh air and deliver conditioned air to the enclosure, means responsive to the dry bulb temperature and the relative humidity within the enclosure for dehumidifying and cooling the air, and means responsive to the relative humidity conditions within the enclosure and said air transmitting means for rehumidifying the air within the air transmitting means.

2. An air conditioning system for an enclosure comprising air transmitting means to receive fresh air and deliver conditioned air to the enclosure, means responsive to the dry bulb temperature and the relative humidity within the enclosure for dehumidifying and cooling the air and means responsive to the relative humidity within the enclosure for rehumidifying the air within air transmitting means; said dehumidifying and cooling means comprising in combination introducing means to bring hygroscopic fluid into contact with the air in said air transmitting means and cooling means to cool the air therein and the hygroscopic fluid in contact with said air.

3. An air conditioning system for an enclosure comprising air transmitting means to receive fresh air and deliver conditioned air to the enclosure, means responsive to the dry bulb temperature and the relative humidity within the enclosure for dehumidifying and cooling the air and means responsive to the relative humidity within the enclosure for rehumidifying the air within air transmitting means; said dehumidifying and cooling means comprising in combination introducing means to bring hygroscopic fluid into contact with the air in said air transmitting means and cooling means to cool the air therein and the hygroscopic fluid in contact with said air, said rehumidifying means comprising second introducing means to bring water into intimate contact with the air in said air transmitting means.

4. An air conditioning system for an enclosure comprising air transmitting means to receive fresh air and deliver conditioned air to the enclosure, means responsive to the dry bulb temperature and the relative humidity within the enclosure for dehumidifying and cooling the air and means responsive to the relative humidity within the enclosure for rehumidifying the air within air transmitting means; said dehumidifying and cooling means comprising in combination introducing means to bring hygroscopic fluid into contact with the air in said air transmitting means and cooling means to cool the air therein and the hygroscopic fluid in contact with said air, and means to operate said dehumidifying and cooling means when the relative humidity in the enclosure is too high.

5. An air conditioning system for an enclosure comprising air transmitting means to receive fresh air and deliver conditioned air to the enclosure, means responsive to the dry bulb temperature and the relative humidity within the enclosure for dehumidifying and cooling the air and means responsive to the relative humidity within the enclosure for rehumidifying the air within air transmitting means; said dehumidifying and cooling means comprising in combination introducing means to bring hygroscopic fluid into contact with the air in said air transmitting means and cooling means to cool the air therein and the hygroscopic fluid in contact with said air, and means to operate said dehumidifying and cooling means when the dry bulb temperature in the enclosure is too high.

6. An air conditioning system for an enclosure comprising air transmitting means to receive fresh air and deliver conditioned air to the enclosure, means responsive to the dry bulb temperature and the relative humidity within the enclosure for dehumidifying and cooling the air by bringing it into contact with hygroscopic fluid and means responsive to the relative humidity within the enclosure for rehumidifying the air within air transmitting means; said rehumidifying means comprising introducing means to bring water into intimate contact with the air in said air transmitting means, and means to operate said dehumidifying, cooling and rehumidifying means when the dry bulb temperature in the enclosure is too high and the relative humidity in the enclosure is sufficiently low to permit adiabatic cooling of said air.

7. An air conditioning system for an enclosure comprising air transmitting means to receive fresh air and deliver conditioned air to the enclosure, means responsive to the dry bulb temperature and the relative humidity within the enclosure for dehumidifying and cooling the air and means responsive to the relative humidity conditions within the enclosure and the air transmitting means for rehumidifying the air within the air transmitting means; said rehumidifying means comprising introducing means to bring water into intimate contact with the air in said air transmitting means and means to operate said dehumidifying, cooling and rehumidifying means when the dry bulb temperature in the enclosure is too high and the relative humidity conditions in the enclosure and within the air transmitting means are sufficiently low to permit adiabatic cooling of said air.

8. An air conditioning system for an enclosure comprising air transmitting means to receive fresh air and deliver conditioned air to the enclosure, including driving means to transmit air through said air transmitting means, means humidifying and heating the air within the air transmitting means, means responsive to the temperature of said heating means, means responsive to the temperature within the enclosure and means responsive to said last-named means to operate said humidifying and heating means when the dry bulb temperature in the enclosure is too low, means to operate the driving means when the temperature of said heating means is high, means to interrupt operation of said humidifying and heating means when dry bulb temperature within the enclosure is relatively high, and means to interrupt said driving means when the temperature of said heating means is relatively low.

9. A method of dehydrating air which comprises bringing into contact with the air a hygroscopic fluid, whereby the fluid is diluted and the latent heat of condensation of the moisture removed by the fluid is converted to additional sensible heat retained by the air, cooling a stream of water, dividing said cooled stream into a first stream and a second stream, cooling the dehydrated air by heat exchange with said first stream of water out of contact with the air to absorb said additional sensible heat, subdividing said second stream of water into first and second portions, vaporizing the dilute hygroscopic fluid at sub-atmospheric pressure to form hydroscopic fluid vapor and water vapor, injecting into said vapors the first portion of said second stream of water at a rate responsive to the temperature and pressure of said vapors to condense and concentrate the hygroscopic fluid vapor and vaporize said injected water, condensing said water vapors by bringing them into contact with the second portion of said second stream of water, injecting said first stream of water to create reduced pressure for evacuating the condensed and condensing water and mixing the first and second streams of water, recycling said mixed stream of water for recooling and redivision, cooling the concentrated hygroscopic fluid by heat exchange with the dilute hygroscopic fluid and said second stream of water before said second stream of water is subdivided into said first and second portions, and recycling the cooled and concentrated hygroscopic fluid for contact with the air.

10. A method as defined in claim 9 wherein a portion of the dilute hygroscopic fluid is cooled by heat exchange with the second stream of water and recycled directly for contact with the air.

11. An air conditioning system comprising an air conditioning chamber, means within said chamber for bringing air into contact with a hygroscopic fluid, a cooling coil in said chamber, first and second heat exchangers, a regenerator for the hygroscopic fluid including a vaporizer, a fractionating column, a condenser, and an evacuator, a cooling tower, means for dividing water from the cooling tower into a first stream and a second stream, means for introducing said first stream of cooling water successively into the cooling coil and into the evacuator, means for passing the second stream of water through the second heat exchanger, means responsive to the temperature in the fractionating column for injecting into the fractionating column as a reflux a portion of the water in the second stream at a rate controlled by said temperature responsive means, means for introducing the balance of the water in the second stream into the condenser, means for recycling the water from the condenser and the evacuator to the cooling tower, means for passing the hygroscopic fluid from the air conditioning chamber through the first heat exchanger and into the vaporizer, and means for removing concentrated hygroscopic fluid from the vaporizer, passing it successively through the first and second heat exchangers, and recycling it to the air conditioning chamber.

12. An air conditioning system as defined in claim 11 comprising in addition a third heat exchanger, means for passing the second stream of water through said third heat exchanger in advance of said second heat exchanger, and means for bleeding off a portion of the hygroscopic fluid from the air conditioning chamber, passing the bled off portion through the third heat exchanger and recycling it directly to the air conditioning chamber.

HENRY W. ANGELERY.

REFERENCES CITED

The following references are of record in the file of this patent:

UNITED STATES PATENTS

| Number | Name | Date |
| --- | --- | --- |
| 1,673,374 | Peters | June 12, 1928 |
| 2,017,027 | Forrest | Oct. 8, 1935 |
| 2,019,291 | Brace et al. | Oct. 29, 1935 |
| 2,177,068 | Hutchinson | Oct. 24, 1939 |
| 2,192,126 | Downs | Feb. 27, 1940 |
| 2,199,967 | Bichowsky | May 7, 1940 |
| 2,207,714 | Bulkeley | July 16, 1940 |
| 2,214,880 | Crawford | Sept. 17, 1940 |
| 2,273,108 | Hibbard | Feb. 17, 1942 |
| 2,276,970 | Hibberd | Mar. 17, 1942 |
| 2,286,618 | Hiller | June 16, 1942 |
| 2,292,486 | Steinfeld | Aug. 11, 1942 |
| 2,406,375 | Hoyte | Aug. 27, 1946 |